US009467286B2

(12) United States Patent
Ohya et al.

(10) Patent No.: US 9,467,286 B2
(45) Date of Patent: Oct. 11, 2016

(54) ENCRYPTION DEVICE, DECRYPTION DEVICE, ENCRYPTION METHOD, DECRYPTION METHOD, AND PROGRAM

(71) Applicants: CRYPTO BASIC CORPORATION, Kawasaki-shi, Kanagawa (JP); Acteiive Corporation, Chiba (JP)

(72) Inventors: Masanori Ohya, Tokyo (JP); Satoshi Iriyama, Tokyo (JP); Luigi Accardi, Rome (IT); Massimo Regoli, Rome (IT)

(73) Assignees: CRYPTO BASIC CORPORATION, Kawasaki-shi, Kawagawa (JP); Acteiive Corporation, Chiba (JP)

( * ) Notice: Subject to any disclaimer, the term of this patent is extended or adjusted under 35 U.S.C. 154(b) by 0 days.

(21) Appl. No.: 14/390,204

(22) PCT Filed: Mar. 15, 2013

(86) PCT No.: PCT/JP2013/057509
§ 371 (c)(1),
(2) Date: Oct. 2, 2014

(87) PCT Pub. No.: WO2013/150880
PCT Pub. Date: Oct. 10, 2013

(65) Prior Publication Data
US 2015/0110269 A1    Apr. 23, 2015

(30) Foreign Application Priority Data

Apr. 2, 2012  (JP) .................................. 2012-084113

(51) Int. Cl.
*H04L 9/08* (2006.01)
*H04L 9/06* (2006.01)

(52) U.S. Cl.
CPC ........... *H04L 9/0869* (2013.01); *H04L 9/0668* (2013.01); *H04L 2209/24* (2013.01)

(58) Field of Classification Search
CPC  H04L 9/0668; H04L 9/0869; H04L 2209/24
See application file for complete search history.

(56) References Cited

U.S. PATENT DOCUMENTS

2004/0086117 A1*  5/2004  Petersen ................. H04L 9/001
                                                                     380/44

FOREIGN PATENT DOCUMENTS

JP      2001358709      12/2001
JP      2003-241656      8/2003
(Continued)

OTHER PUBLICATIONS

A. Yamamura, "A Functional Cryptosystem Using a Group Action," ACISP'99, pp. 314-325, 1999.*

(Continued)

*Primary Examiner* — Robert Leung
(74) *Attorney, Agent, or Firm* — Thomas | Horstemeyer, LLP

(57) ABSTRACT

An encryption device generates non-commutative matrices A1, A2 based on private data A and prime numbers p1, p2, and operates the non-commutative matrices A1, A2 on vectors $v_i^1$, $v_{i-1}^2$. The encryption device performs non-linear transformation to transform the vectors $v_i^1$, $v_i^2$ into bit sequences, and joins these to the bit sequences W1, W2. The encryption device repeats the operation of the non-convertible matrices and the non-linear transformation until the respective numbers of bits of the bit sequence W1 and the bit sequence W2 have reached a number of bits of a bit sequence expressing encryption target data. The encryption device derives a pseudo-random number bit sequence by computing the exclusive logical sum between the bit sequence W1 and the bit sequence W2, and performs encryption using the pseudo-random number bit sequence. The encryption device is thereby able to increase the speed of encryption processing and to increase the cryptographic strength in cases in which the number of bits of the encryption target data is modifiable.

13 Claims, 5 Drawing Sheets

(56) References Cited

FOREIGN PATENT DOCUMENTS

| JP | 2007264147 | 10/2007 |
|---|---|---|
| JP | 2009-005164 | 1/2009 |

OTHER PUBLICATIONS

J. Zumbragel, "Public-Key Cryptography Based on Simple Semirings," Dissertation for PhD at University of Zurich, 2008, 99 pages.*
C. Monico, "Semirings and Semigroup Actions in Public-Key Cryptography," Dissertation for PhD at University of Notre Dame, Apr. 2002, 61 pages.*
M. Abundo et al, Hyperbolic automorphisms of 1-9 tori and pseudo-random sequences, CALCOLO, Sep. 1, 1992, vol. 29, Issue 3-4, p. 213-240.
Accardi, L et al, The QP-DYN Algorithms, [online], 2011, [retrieval date Apr. 8, 2013], internet, <URL: http://www.cryptalarm.it/ca/documenti/upload2s et/8125_chap01.pdf>.
International Search Report Application No. PCT/JP2013/057509 dated Apr. 16, 2013, 4 pages.
Supplementary European Search Report for EP Application No. 13773112.1 based on PCT/JP2013/057509 dated Nov. 24, 2015. (9 pages).
Zumbragel J: "Public-Key Cryptography Based on Simple Semirings", Dissertation Universitat Zurich, Jan. 1, 2008 (Jan. 1, 2008), pp. 1-109. XP007919946, * paragraph [0002]*.
Akihiro Yamamura Ed-Josef Pieprzyk et al: "A Functional Cryptosystem Using a Group Action", Jan. 1, 2001 (Jan. 1, 2001), Information Security and Privacy Lecture Notes in Computer Science, Springer, Berlin, DE, pp. 314-325, XP019048274m ISBN: 978-3-540-65756-9 * paragraph [0003]-paragraph [0004]*.
Gerard Maze et al: "Public key cryptography based on semigroup actions", Advances in Mathematics of Communication, American Institute of Mathematical Sciences, US, vol. 1. No. 4. Jan. 1, 2007 (Jan. 1, 2007), pp. 489-507. XP007919949, ISSN: 1930-5346 * paragraph [0003]-paragraph [0005] *.
Gerard Maze et al: "Public Key Cryptography Based on Simple Modules over Simple Rings", 20020626, Jun. 26, 2002 (Jun. 26, 2002). pp. 1-8, XP007919951, Retrieved from the Internet: URL:http://www.nd.edu/~mtns/papers/27897.pdf * paragraph [0003] *.
Christoher Monico: "Semirings and semigroup actions in public key cryptograpy", Dissertation of the University of Notre Dame in Partial Fullment of the Requirements, Apr. 1, 2002 (Apr. 1, 2002), pp. 1-69, XP007919957, * paragraph [0004]*.

* cited by examiner

FIG.3A

ENCRYPTION

Plaintext XOR    Key      → cyphertext
0101011    ⊕    1100110   →   1011101

FIG.3B

DECRYPTION

Cyphertext XOR   Key      → plaintext
1011101    ⊕    1100110   →   0101011

ENCRYPTION DEVICE, DECRYPTION DEVICE, ENCRYPTION METHOD, DECRYPTION METHOD, AND PROGRAM

CROSS-REFERENCE TO RELATED APPLICATION

This application is the National Stage of International Application No. PCT/JP2013/057509, filed 15 Mar. 2013, which claims the benefit of and priority to JP 2012-084113, filed 2 Apr. 2012, the contents of both of which are incorporated by reference as if fully set forth herein.

TECHNICAL FIELD

The present invention relates to an encryption device, a decryption device, an encryption method, a decryption method, and a program.

BACKGROUND ART

Encryption devices are known that both increase the speed of encryption processing and also improve the cryptographic strength (Japanese Patent Application Laid-Open (JP-A) No. 2003-241656). In such encryption devices, plain text D is divided and output as plural divided data sets by an initial processing function, the plural divided data sets are then expansion-substituted to the same size as an encryption key K by a calculation function, with the calculation function modifiable through a coefficient. The coefficient is generated by a parameter generation section. A non-linear encryption block processing section then non-linearly encrypts the divided data and the encryption key K as a variable, and outputs encrypted plural divided encrypted data. Then in a post processing function, an inverse function to the calculation function is employed to compression-substitute the divided encrypted data to the same size as the divided data, the divided data is then combined and output as encrypted text, with the inverse function calculation function modifiable through a coefficient.

An encryption processing device is also known including: means to mask secret data a, b, and compute masked secret data A, B by computation of an exclusive logical sum between the secret data a, b and random number data m1, m2; means to compute intermediate values Temp1 to Temp3 to remove the mask from the masked secret data A, B using the masked secret data A, B and the random number data m1, m2; and means to calculate the logical product or the logical sum of the secret data a, b using the masked secret data A, B and the intermediate values Temp1 to Temp3 (JP-A No. 2009-005164).

The encryption processing technology described in JP-A Nos. 2003-241656 and 2009-005164 strive to achieve high speed encryption processing and higher security; however, they have issues such as potential danger due to the possibility of being solved logically. In order to alleviate such issues, sometimes the volume is increased, at the expense of speed, and they are not technology that as a whole satisfies the demands of encryption processing for "speed", "security", and "lightness". To address this, an encryption method has been proposed based on an irreversible function that is not logically solvable (L. Accardi, M. Regoli, M. Ohya, "The QP-DYN Algorithm", QP-PQ 28, Quantum Bio-Informatics IV, 1-16, 2011).

DISCLOSURE OF INVENTION

Technical Problem

The concept of encryption processing is described in the technology described in L. Accardi, M. Regoli, M. Ohya, "The QP-DYN Algorithm", QP-PQ 28, Quantum Bio-Informatics IV, 1-16, 2011. However, configuration for a conversion to a dynamic system that determines high speed and encryption robustness, and derivation of a vector sequence, and the like, and moreover the implementation of the encryption processing in a device are difficult.

The present invention is arrived at in consideration of the above issues.

Solution to Problem

In order to achieve the above objective, an encryption device according to a first aspect is configured including: a matrix generation section that generates two non-commutative matrices A1, A2 based on a d×d matrix A and two prime numbers p1, p2, wherein the d×d matrix A is private data that is set in common with a decryption device; a matrix operation section that derives a vector $v_i^1$ by operating the non-commutative matrix A1 on a d dimensional initial vector $v_0$ that is set in common with the decryption device or on a d dimensional vector $v_{i-1}^1$ derived the previous time, and that derives a vector $v_i^2$ by operating the non-commutative matrix A2 on the initial vector $v_0$ or on a d dimensional vector $v_{i-1}^2$ derived the previous time, wherein at least one out of a sum calculation or a product calculation of operations of the non-commutative matrices A1, A2 is substituted into a predetermined calculation method combining a plurality of operator types, and operations of the non-commutative matrices A1, A2 are performed; a bit sequence transformation section that derives a bit sequence W1 by performing non-linear transformation to transform the vector $v_i^1$ derived by the matrix operation section into a bit sequence and by joining the transformed bit sequence to the bit sequence W1 derived the previous time, and that derives a bit sequence W2 by performing non-linear transformation to transform the vector $v_i^2$ into a bit sequence and by joining the transformed bit sequence to the bit sequence W2 derived the previous time; a bit number determination section that repeats the operation by the matrix operation section and the transformation and joining of the bit sequence transformation section until the respective numbers of bits of the bit sequence W1 and the bit sequence W2 derived by the bit sequence transformation section have reached a number of bits of a bit sequence expressing encryption target data; a pseudo-random number sequence generation section that derives a pseudo-random number bit sequence by computing an exclusive logical sum between the bit sequence W1 and the bit sequence W2; and an encryption section that encrypts encryption target data by computing an exclusive logical sum between the pseudo-random number bit sequence derived by the pseudo-random number sequence generation section and the bit sequence expressing the encryption target data.

A program according to a second aspect is a program that causes a computer to function as: a matrix generation section that generates two non-commutative matrices A1, A2 based on a d×d matrix A and two prime numbers p1, p2, wherein the d×d matrix A is private data that is set in common with a decryption device; a matrix operation section that derives a vector $v_i^1$ by operating the non-commutative matrix A1 on a d dimensional initial vector $v_0$ that is set in common with the decryption device or on a d dimensional vector $v_{i-1}^1$ derived the previous time, and that derives a vector $v_i^2$ by operating the non-commutative matrix A2 on the initial vector $v_0$ or on a d dimensional vector $v_{i-1}^2$ derived the previous time, wherein at least one out of a sum calculation or a product calculation of operations of the non-commutative matrices A1, A2 is substituted into a predetermined calculation method combining a plurality of operator types, and operations of the non-commutative matrices A1, A2 are performed; a bit sequence transformation section that derives a bit sequence W1 by performing non-linear transformation to transform the vector $v_i^1$ derived by the matrix operation section into a bit sequence and joining the transformed bit sequence to the bit sequence W1 derived the previous time, and that derives a bit sequence W2 by performing non-linear transformation to transform the vector $v_i^2$ into a bit sequence and by joining the transformed bit sequence to the bit sequence W2 derived the previous time; a bit number determination section that repeats the operation by the matrix operation section and the transformation and by joining of the bit sequence transformation section until the respective numbers of bits of the bit sequence W1 and the bit sequence W2 derived by the bit sequence transformation section have reached a number of bits of a bit sequence expressing encryption target data; a pseudo-random number sequence generation section that derives a pseudo-random number bit sequence by computing an exclusive logical sum between the bit sequence W1 and the bit sequence W2; and an encryption section that encrypts encryption target data by computing an exclusive logical sum between the pseudo-random number bit sequence derived by the pseudo-random number sequence generation section and the bit sequence expressing the encryption target data.

In this manner, at least one out of a sum calculation or a product calculation of operations of the non-commutative matrices A1, A2 is substituted into a calculation method combining plural operator types, the non-commutative matrices A1, A2 are repeatedly operated on a vector and non-linear transformation is performed, an exclusive logical sum of the obtained bit sequences W1, W2 is computed, and a pseudo-random number bit sequence is derived. Encrypting with the pseudo-random number sequence bit enables the speed of encryption processing to be increased and enables cryptographic strength to be increased in cases in which the number of bits of the encryption target data is modifiable.

A matrix operation section according to a third aspect may, during derivation of the vector $v_i^1$ by operating the non-commutative matrix A1 on the initial vector $v_0$ or the vector $v_{i-1}^1$ derived the previous time, for each member of the vector $v_i^1$, compute the member of the vector $v_i^1$ by operating the non-commutative matrix A1 on the initial vector $v_0$ or the vector $v_{i-1}^1$ that has been substituted with a member of an already computed vector $v_i^1$, and, during derivation of the vector $v_i^2$ by operating the non-commutative matrix A2 on the initial vector $v_0$ or the vector $v_{i-1}^2$ derived the previous time, for each member of the vector $v_i^2$, compute the member of the vector $v_i^2$ by operating the non-commutative matrix A2 on the initial vector $v_0$ or the vector $v_{i-1}^2$ that has been substituted with a member of an already computed vector $v_i^2$. This thereby enables cryptographic strength to be increased.

A bit sequence transformation section according to a fourth aspect may, as non-linear transformation, transform the vector $v_i^1$ derived by the matrix operation section into a bit sequence and perform cutoff processing on the transformed bit sequence to cut off a leading bit sequence satisfying a predetermined condition, join the bit sequence from which the leading bit sequence has been cut off to the bit sequence W1 derived the previous time, transform the vector $v_i^2$ into a bit sequence, perform the cutoff processing on the transformed bit sequence, and join the bit sequence from which the leading bit sequence has been cut off to the bit sequence W2 derived the previous time. This thereby enables cryptographic strength to be increased.

A bit sequence transformation section according to a fifth aspect may, as the cutoff processing, cut from the transformed bit sequence a leading bit sequence consisting of continuous 0s from the start and a first 1 appearing after the start as the leading bit sequence satisfying the predetermined condition, and perform processing to cut a leading bit sequence of a predetermined number of bits from the bit sequence from which the leading bit sequence has been cut. This thereby enables cryptographic strength to be increased.

A decryption device according to a sixth aspect is configured including: a matrix generation section that generates two non-commutative matrices A1, A2 based on a d×d matrix A and two prime numbers p1, p2, wherein the d×d matrix A is private data that is set in common with an encryption device; a matrix operation section that derives a vector $v_i^1$ by operating the non-commutative matrix A1 on a d dimensional initial vector $v_0$ that is set in common with the encryption device or on a d dimensional vector $v_{i-1}^1$ derived the previous time, and that derives the vector $v_i^2$ by operating the non-commutative matrix A2 on the initial vector $v_0$ or on a d dimensional vector $v_{i-1}^2$ derived the previous time, wherein at least one out of a sum calculation or a product calculation of operations of the non-commutative matrices A1, A2 is substituted into a predetermined calculation method combining a plurality of operator types, and operations of the non-commutative matrices A1, A2 are performed; a bit sequence transformation section that derives a bit sequence W1 by performing non-linear transformation to transform the vector $v_i^1$ derived by the matrix operation section into a bit sequence and joining the transformed bit sequence to the bit sequence W1 derived the previous time, and that derives a bit sequence W2 by performing non-linear transformation to transform the vector $v_i^2$ into a bit sequence and by joining the transformed bit sequence to the bit sequence W2 derived the previous time; a bit number determination section that repeats the operation by the matrix operation section and the transformation and by joining of the bit sequence transformation section until the respective numbers of bits of the bit sequence W1 and the bit sequence W2 derived by the bit sequence transformation section have reached a number of bits of a bit sequence expressing encryption target data; a pseudo-random number sequence generation section that derives a pseudo-random number bit sequence by computing an exclusive logical sum between the bit sequence W1 and the bit sequence W2; and a decryption section that decrypts decryption target data by computing an exclusive logical sum between the pseudo-random number bit sequence derived by the pseudo-random number sequence generation section and the bit sequence expressing the decryption target data.

A program according to a seventh aspect is a program that causes a computer to function as: a matrix generation section that generates two non-commutative matrices A1, A2 based on a d×d matrix A and two prime numbers p1, p2, wherein the d×d matrix A is private data that is set in common with an encryption device; a matrix operation section that derives a vector $v_i^1$ by operating the non-commutative matrix A1 on a d dimensional initial vector $v_0$ that is set in common with the encryption device or on a d dimensional vector $v_{i-1}^1$ derived the previous time, and that derives the vector $v_i^2$ by operating the non-commutative matrix A2 on the initial vector $v_0$ or on a d dimensional vector $v_{i-1}^2$ derived the previous time, wherein at least one out of a sum calculation or a product calculation of operations of the non-commutative matrices A1, A2 is substituted into a predetermined calculation method combining a plurality of operator types, and operations of the non-commutative matrices A1, A2 are performed; a bit sequence transformation section that derives a bit sequence W1 by performing non-linear transformation to transform the vector $v_i^1$ derived by the matrix operation section into a bit sequence and by joining the transformed bit sequence to the bit sequence W1 derived the previous time, and that derives a bit sequence W2 by performing non-linear transformation to transform the vector $v_i^2$ into a bit sequence and by joining the transformed bit sequence to the bit sequence W2 derived the previous time; a bit number determination section that repeats the operation by the matrix operation section and the transformation and joining of the bit sequence transformation section until the respective numbers of bits of the bit sequence W1 and the bit sequence W2 derived by the bit sequence transformation section have reached a number of bits of a bit sequence expressing decryption target data; a pseudo-random number sequence generation section that derives a pseudo-random number bit sequence by computing an exclusive logical sum between the bit sequence W1 and the bit sequence W2; and a decryption section that decrypts decryption target data by computing an exclusive logical sum between the pseudo-random number bit sequence derived by the pseudo-random number sequence generation section and the bit sequence expressing the decryption target data.

In this manner, at least one out of a sum calculation or a product calculation of operations of the non-commutative matrices A1, A2 is substituted into a calculation method combining plural operator types, the non-commutative matrices A1, A2 are repeatedly operated on a vector and non-linear transformation is performed, an exclusive logical sum of the obtained bit sequences W1, W2 is computed, and a pseudo-random number bit sequence is derived. Decrypting with the pseudo-random number bit sequence enables the speed of decryption processing to be increased and enables cryptographic strength to be increased in cases in which the number of bits of the decryption target data is modifiable.

Advantageous Effects of Invention

According to the encryption device, decryption device, encryption method, decryption method, and program of aspects of the present invention, at least one out of a sum calculation or a product calculation of operations of the non-commutative matrices A1, A2 is substituted into a calculation method combining plural operator types, the non-commutative matrices A1, A2 are repeatedly operated on a vector and non-linear transformation is performed, an exclusive logical sum of the obtained bit sequences W1, W2 is computed, and a pseudo-random number bit sequence is derived. Encrypting or decrypting with the pseudo-random number bit sequence enables the speed of encryption processing or decryption processing to be increased and enables cryptographic strength to be increased in cases in which the number of bits of the encryption target data or the decryption target data is modifiable.

BRIEF DESCRIPTION OF DRAWINGS

FIG. 3A is a diagram to explain an encryption method.
FIG. 3B is a diagram to explain a decryption method.

BEST MODE FOR CARRYING OUT THE INVENTION

Detailed explanation follows regarding an exemplary embodiment of the present invention, with reference to the drawings.

System Configuration

Figure 1:
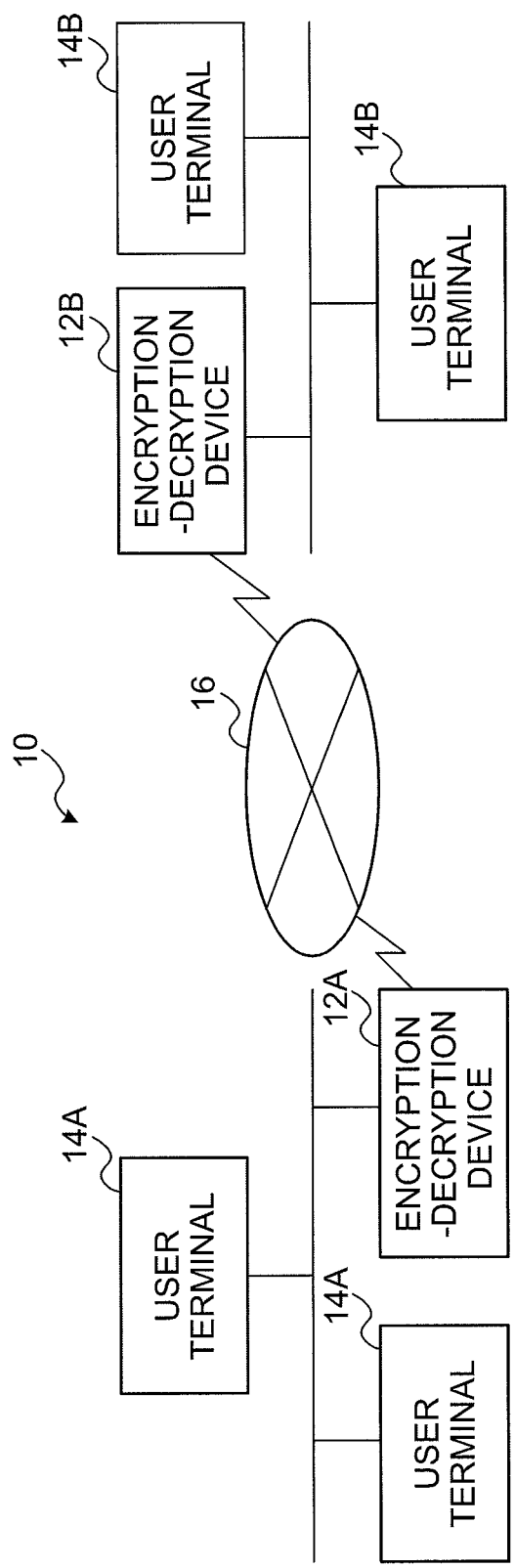
FIG. 1 is a schematic diagram illustrating a configuration of an encryption processing system according to an exemplary embodiment of the present invention.

As illustrated in FIG. 1, an encryption processing system 10 according to an exemplary embodiment of the present invention includes encryption-decryption devices 12A, 12B, plural user terminals 14A, plural user terminals 14B, and an internet access network 16. The encryption-decryption devices 12A, 12B are examples of encryption devices and decryption devices.

The plural user terminals 14A are connected to the encryption-decryption device 12A, and the encryption-decryption device 12A are connected to the internet access network 16. The plural user terminals 14B are connected to the encryption-decryption device 12B, and the encryption-decryption device 12B is connected to the internet access network 16. The encryption-decryption devices 12A, 12B are connected to each other through the internet access network 16.

In order to perform data transmission through the internet access network 16, the user terminals 14A output transmission data to the internet access network 16 through the encryption-decryption device 12A, and in order to perform data reception through the internet access network 16, reception data is input from the internet access network 16 through the encryption-decryption device 12A.

In order to perform data transmission through the internet access network 16, the user terminals 14B output transmission data to the internet access network 16 through the encryption-decryption device 12B, and in order to perform data reception through the internet access network 16, reception data is input from the internet access network 16 through the encryption-decryption device 12B.

Figure 2:
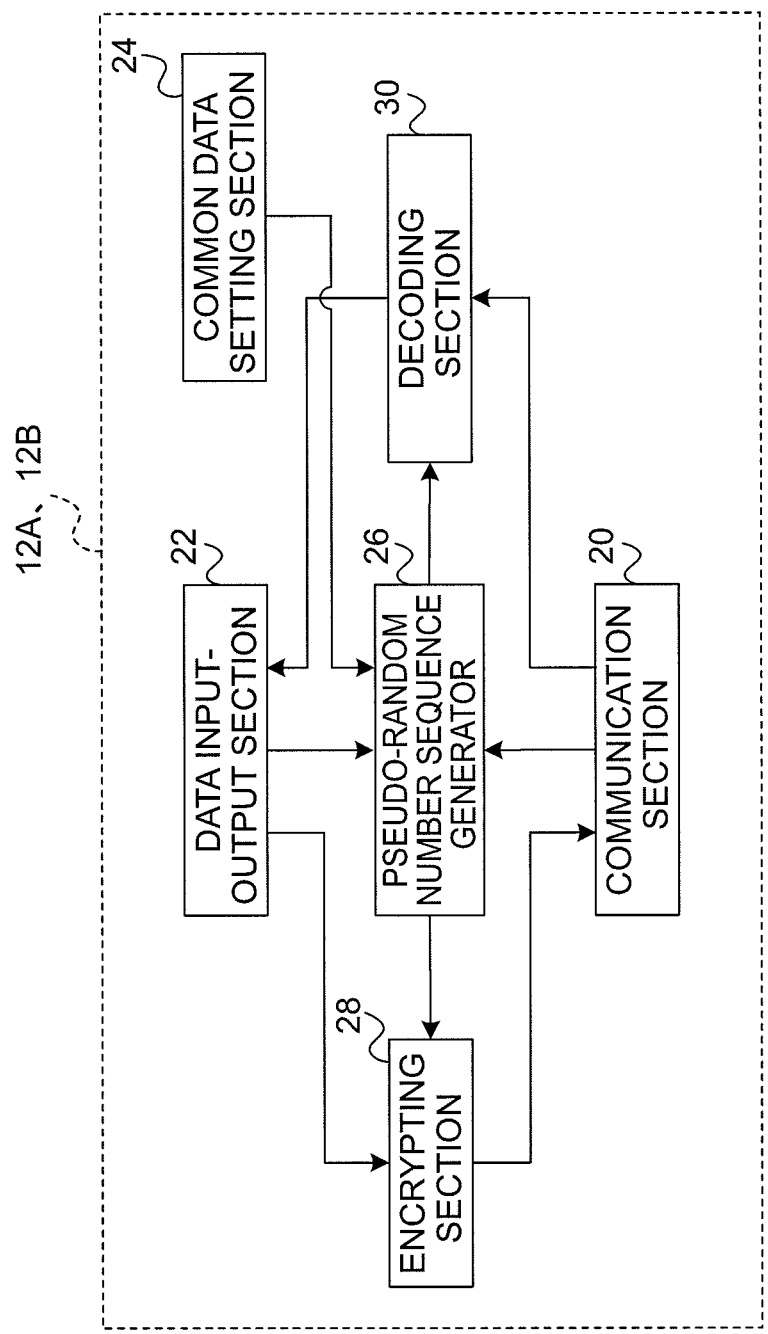
FIG. 2 is a schematic diagram illustrating a configuration of an encryption-decryption device according to an exemplary embodiment of the present invention.

The encryption-decryption devices 12A, 12B are each configured by a computer including a Central Processing Unit (CPU), Random Access Memory (RAM), and Read Only Memory (ROM) stored with a program that executes a pseudo-random number sequence generation processing routine, described below, and have the following functional configuration. As illustrated in FIG. 2, the encryption-decryption devices 12A, 12B include a communication section 20, a data input-output section 22, a common data setting section 24, a pseudo-random number sequence generator 26, an encrypting section 28, and a decryption section 30. Note that the pseudo-random number sequence generator 26 functions as an example of a matrix generation section, a matrix operation section, a bit sequence transformation section, a bit number determination section, and a pseudo-random number sequence generation section.

The communication section 20 performs data transmission and reception through the internet access network 16.

The data input-output section 22 is input with data output from the user terminals 14A, 14B, and outputs data to the user terminals 14A, 14B.

The common data setting section 24 sets common data in the encryption-decryption devices 12A, 12B. More specifically, the common data setting section 24 sets as common data a d×d matrix A, prime numbers p1, p2, and an initial vector v0, wherein the d×d matrix A is private data.

The pseudo-random number sequence generator 26 employs the d×d matrix A, the prime numbers p1, p2, and the initial vector v0, wherein the d×d matrix A is private data, to generate a pseudo-random number bit sequence using a method described below.

The encrypting section 28 performs streaming encryption on encryption target data that has been input by the data input-output section 22, by employing the pseudo-random number bit sequence generated by the pseudo-random number sequence generator 26 as a key for one-time pad encryption. For example, as illustrated in FIG. 3A, encryption is performed from the start one bit at a time (or 1 byte at a time) by calculating the XOR between plain text expressed as a bit sequence, and the pseudo-random number bit sequence used as an encryption key. The data encrypted by the encrypting section 28 is data transmitted by the communication section 20.

The decryption section 30 employs the pseudo-random number bit sequence generated by the pseudo-random number sequence generator 26 as a one-time pad encryption key to perform decryption on decryption target data received by the communication section 20. For example, as illustrated in FIG. 3B, decryption is performed from the start one bit at a time (or 1 byte at a time) by calculating the XOR between cypher text expressed as a bit sequence, and the pseudo-random number bit sequence used as an encryption key. The data decrypted by the decryption section 30 is output to the user terminals 14A, 14B by the data input-output section 22.

Explanation next follows regarding the principle for generating the pseudo-random number bit sequence of the present exemplary embodiment.

First, the pseudo-random number sequence generator 26 employs the d×d matrix A and the prime numbers p1, p2 that have been set as the common private data, to generate two non-commutative matrices A1, A2 as described below. Explanation next follows regarding an example in which the matrix A is a 2×2 matrix.

The pseudo-random number sequence generator 26 computes a matrix A1' using the matrix A and the prime number p1 according to the following Equation (1).

$$A_1' = A \bmod p_1 = \begin{pmatrix} a \bmod p_1 & b \bmod p_1 \\ c \bmod p_1 & d \bmod p_1 \end{pmatrix} = \begin{pmatrix} a' & b' \\ c' & d' \end{pmatrix} \quad \text{Equation (1)}$$

The pseudo-random number sequence generator 26 derives a generator g, $<g>=\{1, \ldots,$ and so on up to $p_1-1\}$. For example, the generator for $p_1=7$ is, as shown below, $<3>=\{1, \ldots,$ and so on up to $6\}$.

$3^1=3$, $3^2=9 \bmod 7=2$, $3^3=27 \bmod 7=6$, $3^4=81 \bmod 7=4$, $3^5=243 \bmod 7=5$, and so on.

With $A_1''$ expressed by the following Equation (2), the pseudo-random number sequence generator 26 then changes d' such that det $A_1''=g$, and takes the A1" with changed d' as a non-commutative matrix A1.

$$A_1'' = \begin{pmatrix} g & b' \\ c' & d' \end{pmatrix}, \quad \text{Equation (2)}$$

The pseudo-random number sequence generator 26 employs the matrix A and the prime number p2 to compute a matrix A2' according to following Equation (3), and generates a non-commutative matrix A2 similarly to as above.

$$A_2' = A \bmod p_2 = \begin{pmatrix} a \bmod p_2 & b \bmod p_2 \\ c \bmod p_2 & d \bmod p_2 \end{pmatrix} \quad \text{Equation (3)}$$

The cycle length O (A) of the pseudo-random number sequence, generated using the non-commutative matrices A1, A2, is as written in following Equation (4), using arbitrary prime numbers p, used in generation of the non-commutative matrices A1, A2.

$$O(A) \geq p \quad \text{Equation (4)}$$

For example, in cases in which p is a 100000 bit prime number, then the cycle of A is the same length or longer.

The pseudo-random number sequence generator 26 then obtains vector $v_1$ by using the generated non-commutative matrix $A_1$ to transform the commonly set initial vector $v_0$. The pseudo-random number sequence generator 26 then obtains a vector sequence $V=\{v_0, v_1,$ and so on up to $v_t\}$ by repeating the transformation on the vector $v_1$ that used the non-commutative matrix $A_1$. Herein $v_i = A_1^i v_0$.

The pseudo-random number sequence generator 26 then obtains a bit sequence $W_1$ by non-linear transformation from the obtained vector sequence V. Then, as a non-linear transformation that obtains bit sequence W from bit sequence V, wherein the members of V given by $v_i=(v_{i,0}, v_{i,1},$ and so on up to $v_{i,n})$, cutoff processing is performed to remove a leading bit sequence, consisting of continuous 0s from the leading bit and the subsequently appearing 1, from a binary transformed bit sequence of $v_{i,0}$. The remaining bit sequence after the cutoff is known to be highly randomized.

In the present exemplary embodiment, two types of cutoff are employed in the cutoff processing: random cut and fixed cut.

In a random cut, as described above, a leading bit sequence is cut that consists of the continuous 0s appearing at the start and the subsequently appearing 1. In a fixed cut, only a predetermined number of bits are cut. For example, if the number of bits for cutting in a fixed cut is 3, then the leading 3 bits are cut from the bit sequence resulting from random cut.

Cutoff processing is performed for all members of $v_i$, and all the members after cutoff processing are sequentially combined to give a bit sequence W.

This enables the strength against attack to be raised since an attacker must test all possible cutoffs in order to decrypt the non-commutative matrices $A_1$, $A_2$.

Moreover, in the present exemplary embodiment, during obtaining a new vector $v_{i+1}$ by operating the non-commutative matrices A1, A2 on the vector $v_i$, a sum calculation or product calculation between numbers is substituted into a calculation in which plural operators are combined as described below.

For example, if a, b are 32 bit numbers, symbol a<<k is a symbol obtained by shifting a by k bits, (sum calculation) a+b is substituted with a+b mod $2^{32}$. Moreover, (product calculation) a×b is substituted with a<<(b/$2^{27}$) XOR b. a<<(b/$2^{27}$) represents that a is shifted by the quotient of b divided by $2^{27}$, and XOR represents an exclusive logical sum for each bit.

During obtaining a new vector $v_{i+1}$ by operating the non-commutative matrices A1, A2 on the vector $v_i$, substitutions may also be made as in the following method employing a matrix.

For example, if $v_i=(v_i^1, v_i^2$, and so on up to $v_i^d)$ represents the result of operating the matrix A i times on the initial vector v0 (d is the dimension of A), then a method of obtaining $v_{i+1}=(v_{i+1}^1, v_{i+1}^2$, and so on up to $v_i^d)$ is the following.

First, $v_{i+1}^1=(Av_i)^1$. This is only the $1^{st}$ member of vector $Av_i$. The only computation that needs to be made is the computation of the $1^{st}$ member. Writing as a 2×2 matrix:

$$\begin{pmatrix} a & b \\ c & d \end{pmatrix}\begin{pmatrix} v \\ w \end{pmatrix} \rightarrow av+bw$$

wherein the sum calculation and the product calculation are, as described above, substitutable by a separate calculation.

Then $v_{i+1}^2=(A(v_{i+1}^1, v_i^2$, and so on up to $v_i^d))^2$. The second member is found by operating the non-commutative matrix A on the resultant of substituting the $1^{st}$ member of $v_i$ for $v_{i+1}^1$. The only computation that needs to be made here is the computation of the $2^{nd}$ member.

Then, $v_{i+1}^3=(A(v_{i+1}^1, v_{i+1}^2$, and so on up to $v_i^d))^2$. Similarly to as described above, the $3^{rd}$ member is found by substituting the $1^{st}$ member and the $2^{nd}$ member of $v_i$ and operating the non-commutative matrix A thereon.

Similar operations are performed as far as the $d^{th}$ element, and $v_{i+1}$ is obtained.

If n is the number of bits in the plain text to be encrypted, then processing on the bit sequence W1 is stopped at the point when the number of bits of the bit sequence W1 reaches n, and the remaining portion of bit sequence W1 is discarded.

Similarly with the non-commutative matrices $A_2$, the pseudo-random number sequence generator 26 repeatedly performs operation on the vectors and cutoff processing to generate a bit sequence $W_2$. Processing on the bit sequence W2 is stopped at the point when the number of bits of the bit sequence W2 reaches n, and the remaining portion of bit sequence W2 is discarded.

The pseudo-random number sequence generator 26 then computes the XOR between the finally obtained bit sequence $W_1$ and the bit sequence $W_2$, and the obtained bit sequence is taken as a pseudo-random number bit sequence. Further non-linear transformation may be performed on the bit sequence obtained by the XOR between the bit sequence $W_1$ and bit sequence $W_2$, and the result thereof taken as the pseudo-random number bit sequence.

As described above, the pseudo-random number sequence generator 26 generates a pseudo-random number bit sequence with the same number of bits as the number of bits of the encryption target data, or as the number of bits of the decryption target data.

Operation of the Encryption Processing System

Explanation next follows regarding operation of the encryption processing system 10 according to the present exemplary embodiment.

First, in order to transmit data from the user terminal 14A to the user terminal 14B, the user terminal 14A outputs transmission data to the encryption-decryption device 12A.

Figure 4:
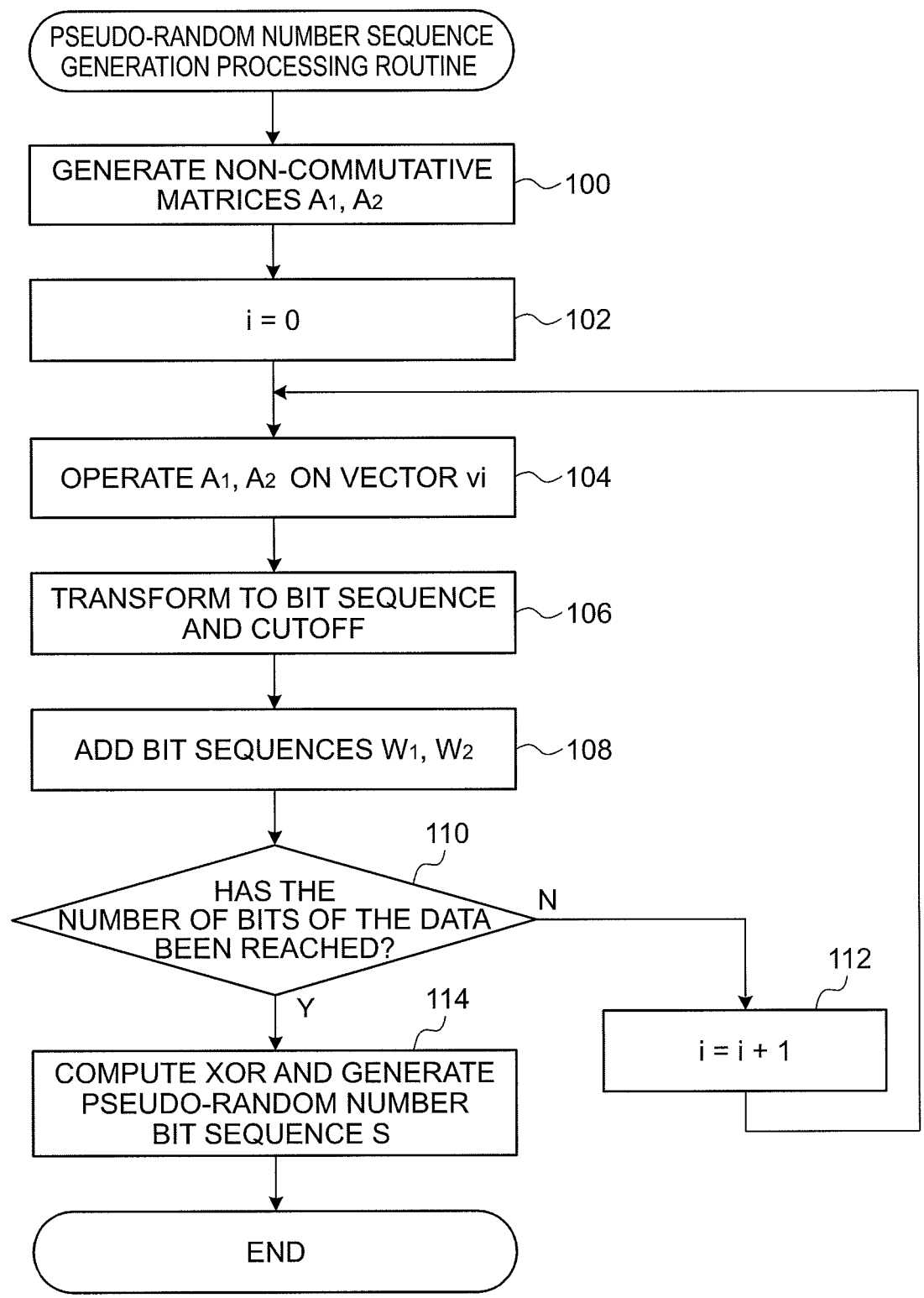
FIG. 4 is a flow chart illustrating contents of a pseudo-random number sequence generation processing routine in an encryption-decryption device according to an exemplary embodiment of the present invention.

The pseudo-random number sequence generation processing routine illustrated in FIG. 4 is executed in the encryption-decryption device 12A.

First, at step 100, the encryption-decryption device 12A employs the non-commutative matrix A and the prime numbers p1, p2 that are set in common with the encryption-decryption device 12B to generate the non-commutative matrices A1, A2. At step 102, the encryption-decryption device 12A sets a variable i that identifies vectors to an initial value of 0. The initial vector v0 is then set.

Next at step 104, the encryption-decryption device 12A respectively operates the non-commutative matrices A1, A2 on the vector $v_b$ and computes the vector $v_{i+1}^1, v_{i+1}^2$. At step 106, the respective vectors $v_{i+1}^1, v_{i+1}^2$ computed at step 104 are transformed into bit sequences, and cutoff processing is performed cut a leading bit sequence from the respective bit sequences. Then at step 108, the encryption-decryption device 12A further adds, sequentially, each of the bit sequences obtained at step 106 to the bit sequences W1, W2.

At step 110, the encryption-decryption device 12A determines whether or not the number of bits of each of the bit sequences W1, W2 has reached the number of bits of the bit sequence of the transmission data (encryption target data). If determined that the number of bits of each of the bit sequences W1, W2 has not reached the number of bits of the bit sequence of the transmission data (encryption target data) input from the user terminal 14A, then, at step 112, the encryption-decryption device 12A increments the variable i by 1, processing returns to step 104, and processing from step 104 onwards is repeated. If the number of bits has reached the number of bits of the transmission data only for the bit sequence W1 then the encryption-decryption device 12A does not perform processing using the non-commutative matrix A1 in the processing from step 104 onwards. If the number of bits has reached the number of bits of the transmission data only for the bit sequence W2 then the encryption-decryption device 12A does not perform processing using the non-commutative matrix A2 in the processing from step 104 onwards.

Processing proceeds to step 114 if the encryption-decryption device 12A has determined at step 110 that the number of bits has reached the number of bits of the transmission data for both the bit sequences W1, W2.

At step 114, the encryption-decryption device 12A calculates the XOR between the bit sequences W1, W2, generates a pseudo-random number bit sequence S, and ends the pseudo-random number sequence generation processing routine.

The encryption-decryption device 12A then generates encrypted transmission data by calculate the XOR between the pseudo-random number bit sequence S generated by the pseudo-random number sequence generation processing routine described above and the bit sequence of the transmission data input from the user terminal 14. The encryption-decryption device 12A then transmits the encrypted transmission data to the user terminal 14B, via the internet access network 16.

The encrypted transmission data is received by the encryption-decryption device 12B, and the pseudo-random number sequence generation processing routine illustrated in FIG. 4 is similarly executed in the encryption-decryption device 12B to generate a pseudo-random number bit sequence S having the same number of bits as the encrypted transmission data.

The encryption-decryption device 12B generates plain text of the encrypted transmission data by calculating the XOR between the generated pseudo-random number bit sequence S and the bit sequence of the encrypted transmission data. The encryption-decryption device 12B outputs transmission data plain text to the user terminal B designated as the transmission destination.

The pseudo-random number sequence that is one component of the above exemplary embodiment has been subjected to a statistical test (NISTU01 test) during the development of the present invention (see F. Giuseppe, "Benchmarking for the QP Cryptographic Suite", Dipartmento di Informatica, Sistemi e Produzione, Universita di Roma "Tor Vergata" (in Italian), 2009). Simple explanation follows regarding the results of the NISTU01 test. The test is performed to acquire only input-output states for the program source in a closed state. NIST refers to the US National Institute of Standards and Technology, and the NISTU01 test is one test implemented for the purpose of satisfying the requirements for encrypting algorithms and devices authorized for use in US state organizations by NIST, and evaluates the security of the pseudo-random number sequence.

An implementation provided in a C library was employed for U01. The test includes SmallCrush, BigCrash, Rabbit, Alphabit, FIPS-140-2, and pseudoDIEHARD. The currently widely used pseudo-random number sequence generation algorithm RC4 was employed for comparison.

The pseudo-random number sequence that is one component of the above exemplary embodiment passed all of the statistical tests, however the RC4 for comparison was not able to pass a lot of the tests. This accordingly shows that the pseudo-random number sequence generation algorithm explained in the exemplary embodiment is capable of generating a statistically secure pseudo random number sequence.

Explanation next follows regarding test results implemented during development of the present invention for an encryption method that is a component of the above exemplary embodiment (also referred to below as QP-DYN).

This test is to verify the encryption speed, and is implemented to verify the encryption speed of streaming encryption (Performance Analysis of Algorithms and Statistical Tests, (in Italian), 2011). In this test too, similarly to the NISTU01, the test is performed to acquire only input-output states of the program source in a closed state.

The test environment was as follows. Performance was as illustrated in the following Table 1 in Windows 7 (registered trade mark).

TABLE 1

| CPU | E5300@2.6 GHz Intel Pentium |
|---|---|
| RAM | 4 GB DDR 2 800 (vData 2 × 2 GB) |
| HDD | 500 GB 7200 RPM (Western Digital Caviar Blue) |
| OS | MS Windows 7 32-bit |

Tests were performed of encrypting data in a number of files (such as LOMB, 100 MB, pdf files, diskimage (ubuntu-10. 10-desktop-i386.iso), mp4 video 3.5G, Word documents), and the volume of encrypted data having been included in the read/write process was measured every second.

AES and TwoFish were employed for comparison. The specifications are illustrated in Table 2.

TABLE 2

| QP-DYN | Key size: | 288 b and 1156 b |
|---|---|---|
| | Buffer size: | 10,000 b |
| | Encryption modes: | OFB |
| AES | Key size: | 256 b |
| | Buffer size: | Decided by the library cryptopp |
| | Encryption modes: | OFP |
| Twofishi | Key size: | 256 b |
| | Buffer size: | Decided by the library cryptopp |
| | Encryption modes: | OFP |

Figure 5:
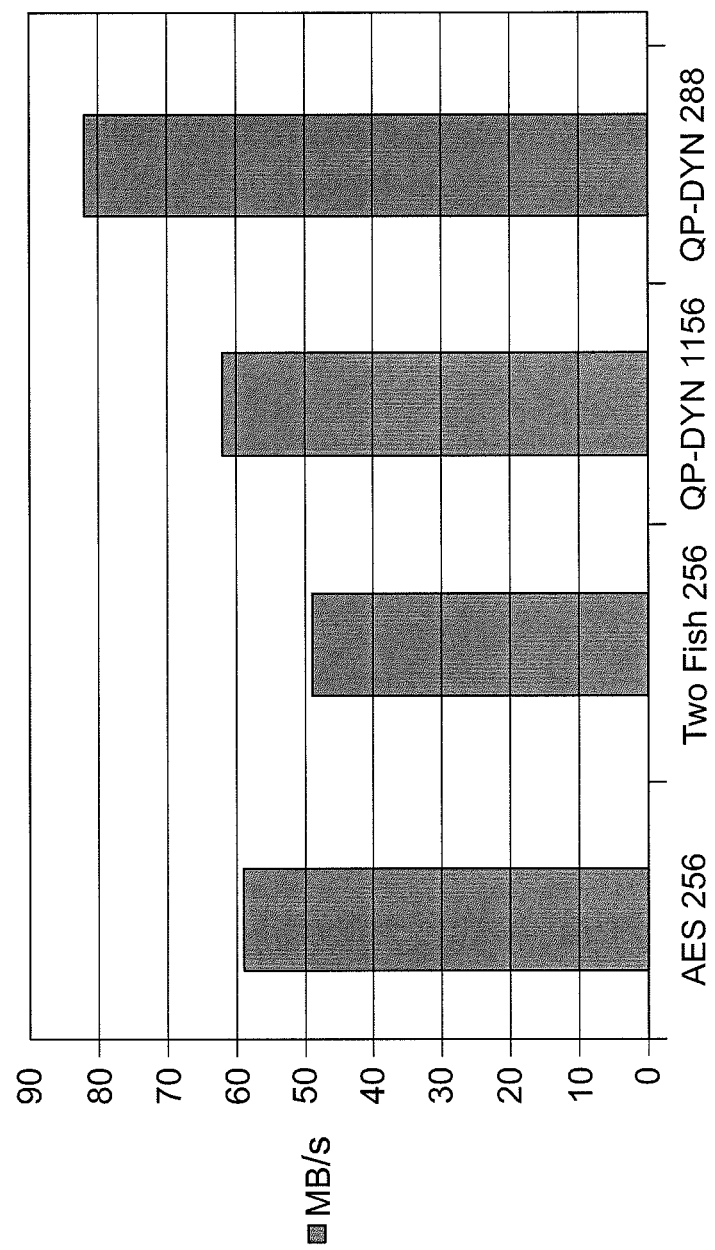
FIG. 5 is a graph illustrating test results.

The encrypted data volume was measured every second for encrypting on each test data, an average was derived, and the test results illustrated in FIG. 5 were obtained. It is apparent that the QP-DYN288 bit and the 1156 bit achieve a greater encrypted data volume per second than AES and TwoFish with 256 bit key length.

As explained above, in the encryption-decryption device according to the exemplary embodiment of the present invention, the sum calculation and the product calculation of operations of the non-commutative matrices A1, A2 are substituted into a calculation method combining plural operator types, the non-commutative matrices A1, A2 are repeatedly operated on the initial vector and non-linear transformation is performed, the XOR of the obtained bit sequences W1, W2 is computed, and a pseudo-random number sequence is derived. By employing the pseudo-random number sequence for encrypting or decrypting, the encryption-decryption device is able to increase the speed of encryption processing or decryption processing in cases in which the number of bits of the encryption target data or the decryption target data is modifiable, and is also able to improve the cryptographic strength.

It is also possible to achieve higher speeds than other streaming encryption protocols, and is executable on a small device with low computing power.

In the pseudo-random number sequence generation algorithm, using a number of non-linear transformations enables the statistical randomness and length of cycle of the pseudo-random number sequence to be assured, and a safe disposable encryption key (one-time pad key) can be generated by using the generated pseudo-random number sequence.

Moreover, due to being able to implement streaming encryption, multimedia files, such as audio and video, can be transmitted both safely and at high speed.

The present invention is not limited by the exemplary embodiment described above, and various modifications and applications are possible within a range not departing from the spirit of the invention.

For example, in addition to streaming encryption, the present invention may also be applied in applications such as vehicle keyless entry. Application may also be made to Hard Disk Drive (HDD) encryption. For example, all the data saved on a HDD may be encrypted by the encryption method of the exemplary embodiment described above so that it can only be read by the authorized user. The present invention is also applicable to security in cloud services.

Explanation has been given in the present specification of an exemplary embodiment in which a program is pre-installed, however the program may be provided stored on a computer-readable storage medium.

A computer-readable storage medium of an aspect of the present invention is stored with a program that causes a computer to function as: a matrix generation section that generates two non-commutative matrices A1, A2 based on a d×d matrix A and two prime numbers p1, p2, wherein the d×d matrix A is private data that is set in common with a decryption device; a matrix operation section that derives a vector $v_i^1$ by operating the non-commutative matrix A1 on a d dimensional initial vector $v_0$ that is set in common with the decryption device or a d dimensional vector $v_{i-1}^1$ derived the previous time, that derives the vector $v_i^2$ by operating the non-commutative matrix A2 on the initial vector $v_0$ or a d dimensional vector $v_{i-1}^2$ derived the previous time, and that substitutes at least one out of a sum calculation or a product calculation of operations of the non-commutative matrices A1, A2 into a predetermined calculation method combining plural operator types, and performs operations of the non-commutative matrices A1, A2; a bit sequence transformation section that derives a bit sequence W1 by performing non-linear transformation to transform the vector $v_i^1$ derived by the matrix operation section into a bit sequence and joining the transformed bit sequence to the bit sequence W1 derived the previous time, and that derives a bit sequence W2 by performing non-linear transformation to transform the vector $v_i^2$ into a bit sequence and joining the transformed bit sequence to the bit sequence W2 derived the previous time; a bit number determination section that repeats the operation by the matrix operation section and the transformation and joining of the bit sequence transformation section until the respective numbers of bits of the bit sequence W1 and the bit sequence W2 derived by the bit sequence transformation section have reached a number of bits of a bit sequence expressing encryption target data; a pseudo-random number sequence generation section that derives a pseudo-random number bit sequence by computing an exclusive logical sum between the bit sequence W1 and the bit sequence W2; and an encryption section that encrypts encryption target data by computing an exclusive logical sum between the pseudo-random number bit sequence derived by the pseudo-random number sequence generation section and the bit sequence expressing the encryption target data.

A computer-readable storage medium of an aspect of the present invention is stored with a program that causes a computer to function as: a matrix generation section that generates two non-commutative matrices A1, A2 based on a d×d matrix A and two prime numbers p1, p2, wherein the d×d matrix A is private data that is set in common with an encryption device; a matrix operation section that derives a vector $v_i^1$ by operating the non-commutative matrix A1 on a d dimensional initial vector $v_0$ that is set in common with the encryption device or on a d dimensional vector $v_{i-1}^1$ derived the previous time, that derives the vector $v_i^2$ by operating the non-commutative matrix A2 on the initial vector $v_0$ or on a d dimensional vector $v_{i-1}^2$ derived the previous time, and that substitutes at least one out of a sum calculation or a product calculation of operations of the non-commutative matrices A1, A2 into a predetermined calculation method combining plural operator types, and performs operations of the non-commutative matrices A1, A2; a bit sequence transformation section that derives a bit sequence W1 by performing non-linear transformation to transform the vector $v_i^1$ derived by the matrix operation section into a bit sequence and by joining the transformed bit sequence to the bit sequence W1 derived the previous time, and that derives a bit sequence W2 by performing non-linear transformation to transform the vector $v_i^2$ into a bit sequence and by joining the transformed bit sequence to the bit sequence W2 derived the previous time; a bit number determination section that repeats the operation by the matrix operation section and the transformation and joining of the bit sequence transformation section until the respective numbers of bits of the bit sequence W1 and the bit sequence W2 derived by the bit sequence transformation section have reached a number of bits of a bit sequence expressing decryption target data; a pseudo-random number sequence generation section that derives a pseudo-random number bit sequence by computing an exclusive logical sum between the bit sequence W1 and the bit sequence W2; and a decryption section that decrypts decryption target data by computing an exclusive logical sum between the pseudo-random number bit sequence derived by the pseudo-random number sequence generation section and the bit sequence expressing the decryption target data.

The entire disclosure of Japanese Patent Application 2012-084113 is incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference patent application, or technical standard was specifically and individually indicated to be incorporated by reference.

The invention claimed is:

1. An encryption device, comprising:
   at least one processor; and
   a memory in communication with the at least one processor, the memory storing computer-executable instructions, wherein when executed the computer-executable instructions cause the at least one processor to at least:
   generate two non-commutative matrices A1, A2 based on a d×d matrix A and two prime numbers p1, p2, wherein the d×d matrix A is private data that is set in common with a decryption device;
   derive a vector $v_i^1$ by performing a plurality of matrix operations between the non-commutative matrix A1 and at least one of a d dimensional initial vector $v_0$ that is set in common with the encryption device or a previously derived d dimensional vector $v_{i-1}^1$, and derive a vector $v_i^2$ by performing the plurality of matrix operations between the non-commutative matrix A2 and at least one of the initial vector $v_0$ or a previously derived d dimensional vector $v_{i-1}^2$, wherein the plurality of matrix operations comprises at least one of a sum calculation or a product calculation;
   derive a bit sequence W1 by performing non-linear transformation to transform the vector $v_i^1$ into a current bit sequence of W1 and by joining the current bit sequence of W1 to at least one previously derived bit sequence of W1, and derive a bit sequence W2 by performing non-linear transformation to transform the vector $v_i^2$ into a current bit sequence of W2 and by joining the current bit sequence of W2 to at least one previously derived bit sequence of W2;
   repeat the deriving and the joining of the bit sequences of W1 and the bit sequences of W2 until a number of bits of each of the bit sequence W1 and the bit sequence W2 is equal to a number of bits of a bit sequence expressing encryption target data;

derive a pseudo-random number bit sequence by computing an exclusive logical sum between the bit sequence W1 and the bit sequence W2; and encrypt the encryption target data by computing an exclusive logical sum between the pseudo-random number bit sequence and the bit sequence expressing the encryption target data.

2. The encryption device of claim 1, wherein:

the vector $v_i^1$ comprises at least one member and during derivation of the vector $v_i^1$ each member of the vector $v_i^1$ is computed by performing the plurality of matrix operations between the non-commutative matrix A1 and the initial vector $v_0$ or the previously derived vector $v_{i-1}^1$ that has been substituted with a member of an already computed vector $v_i^1$; and the vector $v_i^2$ comprises at least one member and during derivation of the vector $v_i^2$ each member of the vector $v_i^2$ is computed by performing the plurality of matrix operations between the non-commutative matrix A2 and the initial vector $v_0$ or the previously derived vector $v_{i-1}^2$ that has been substituted with a member of an already computed vector $v_i^2$.

3. The encryption device of claim 1, wherein:

deriving the bit sequence W1 further comprises performing a cutoff process on the current bit sequence of W1 to cut off a leading bit sequence satisfying a predetermined condition, and joining the current bit sequence of W1 from which the leading bit sequence has been cut off to the previously derived bit sequence of W1 from which the leading bit sequence has been cut off; and deriving the bit sequence W2 further comprises performing the cutoff process on the current bit sequence of W2 to cut off the leading bit sequence satisfying the predetermined condition, and joining the current bit sequence of W2 from which the leading bit sequence has been cut off to the previously derived bit sequence of W2 from which the leading bit sequence has been cut off.

4. The encryption device of claim 3, wherein:

the leading bit sequence consists of continuous 0s and a first 1 appearing after the continuous 0s, and the cutoff process further cuts off a predetermined number of bits after the leading bit sequence.

5. A decryption device, comprising:

at least one processor; and a memory in communication with the at least one processor, the memory storing computer-executable instructions, wherein when executed the computer-executable instructions cause the at least one processor to at least:

generate two non-commutative matrices A1, A2 based on a d×d matrix A and two prime numbers p1, p2, wherein the d×d matrix A is private data that is set in common with an encryption device;

derive a vector $v_i^1$ by performing a plurality of matrix operations between the non-commutative matrix A1 and at least one of a d dimensional initial vector $v_0$ that is set in common with the encryption device or a previously derived d dimensional vector $v_{i-1}^1$, and derive a vector $v_i^2$ by performing the plurality of matrix operations between the non-commutative matrix A2 and at least one of the initial vector $v_0$ or a previously derived d dimensional vector $v_{i-1}^2$, wherein the plurality of matrix operations comprises at least one of a sum calculation or a product calculation;

derive a bit sequence W1 by performing non-linear transformation to transform the vector $v_i^1$ into a current bit sequence of W1 and by joining the current bit sequence of W1 to at least one previously derived bit sequence of W1, and derive a bit sequence W2 by performing non-linear transformation to transform the vector $v_i^2$ into a current bit sequence of W2 and by joining the current bit sequence of W2 to at least one previously derived bit sequence of W2;

repeat the deriving and the joining of the bit sequences of W1 and the bit sequences of W2 until a number of bits of each of the bit sequence W1 and the bit sequence W2 is equal to a number of bits of a bit sequence expressing decryption target data;

derive a pseudo-random number bit sequence by computing an exclusive logical sum between the bit sequence W1 and the bit sequence W2; and decrypt the decryption target data by computing an exclusive logical sum between the pseudo-random number bit sequence and the bit sequence expressing the decryption target data.

6. A non-transitory computer readable medium storing an encryption program executable in a computing device, wherein when executed the encryption program causes the computing device to at least:

generate two non-commutative matrices A1, A2 based on a d×d matrix A and two prime numbers p1, p2, wherein the d×d matrix A is private data that is set in common with a decryption device;

derive a vector $v_i^1$ by performing a plurality of matrix operations between the non-commutative matrix A1 and at least one of a d dimensional initial vector $v_0$ that is set in common with the decryption device or a previously derived d dimensional vector $v_{i-1}^1$, and derive a vector $v_i^2$ by performing the plurality of matrix operations between the non-commutative matrix A2 and at least one of the initial vector $v_0$ or a previously derived d dimensional vector $v_{i-1}^2$, wherein the plurality of matrix operations comprises at least one of a sum calculation or a product calculation;

derive a bit sequence W1 by performing non-linear transformation to transform the vector $v_i^1$ into a current bit sequence of W1 and by joining the current bit sequence of W1 to a previously derived bit sequence of W1, and derive a bit sequence W2 by performing non-linear transformation to transform the vector $v_i^2$ into a current bit sequence of W2 and by joining the current bit sequence of W2 to a previously derived bit sequence of W2;

repeat the deriving and the joining of the bit sequences of W1 and the bit sequences of W2 until a number of bits of each of the bit sequence W1 and the bit sequence W2 is equal to a number of bits of a bit sequence expressing encryption target data;

derive a pseudo-random number bit sequence by computing an exclusive logical sum between the bit sequence W1 and the bit sequence W2; and encrypt the encryption target data by computing an exclusive logical sum between the pseudo-random number bit sequence and the bit sequence expressing the encryption target data.

7. A non-transitory computer readable medium storing a decryption program executable in a computing device, wherein when executed the decryption program causes the computing device to at least:

generate two non-commutative matrices A1, A2 based on a d×d matrix A and two prime numbers p1, p2, wherein the d×d matrix A is private data that is set in common with a decryption device;

derive a vector $v_i^1$ by performing a plurality of matrix operations between the non-commutative matrix A1 and at least one of a d dimensional initial vector $v_0$ that is set in common with the decryption device or a previously derived d dimensional vector $v_{i-1}^1$, and derive a vector $v_i^2$ by performing the plurality of matrix operations between the non-commutative matrix A2 and at least one of the initial vector $v_0$ or a previously derived d dimensional vector $v_{i-1}^2$, wherein the plurality of matrix operations comprises at least one of a sum calculation or a product calculation;

derive a bit sequence W1 by performing non-linear transformation to transform the vector $v_i^1$ into a current bit sequence of W1 and by joining the current bit sequence of W1 to a previously derived bit sequence of W1, and derive a bit sequence W2 by performing non-linear transformation to transform the vector $v_i^2$ into a current bit sequence of W2 and by joining the current bit sequence of W2 to a previously derived bit sequence of W2;

repeat the deriving and the joining of the bit sequences of W1 and the bit sequences of W2 until a number of bits of each of the bit sequence W1 and the bit sequence W2 is equal to a number of bits of a bit sequence expressing decryption target data;

derive a pseudo-random number bit sequence by computing an exclusive logical sum between the bit sequence W1 and the bit sequence W2; and decrypt the decryption target data by computing an exclusive logical sum between the pseudo-random number bit sequence and the bit sequence expressing the decryption target data.

8. An encryption method, comprising:

generating, via a computing device, two non-commutative matrices A1, A2 based on a d×d matrix A and two prime numbers p1, p2, wherein the d×d matrix A is private data that is set in common with a decryption device;

deriving, via the computing device, a vector $v_i^1$ by performing a plurality of matrix operations between the non-commutative matrix A1 and at least one of a d dimensional initial vector $v_0$ that is set in common with the decryption device or a previously derived d dimensional vector $v_{i-1}^1$, and deriving a vector $v_i^2$ by performing the plurality of matrix operations between the non-commutative matrix A2 and at least one of the initial vector $v_0$ or a previously derived d dimensional vector $v_{i-1}^2$, wherein the plurality of matrix operations comprises at least one of a sum calculation or a product calculation;

deriving, via the computing device, a bit sequence W1 by performing non-linear transformation to transform the vector $v_i^1$ into a current bit sequence of W1 and by joining the current bit sequence of W1 to a previously derived bit sequence of W1, and deriving a bit sequence W2 by performing non-linear transformation to transform the vector $v_i^2$ into a current bit sequence of W2 and by joining the current bit sequence of W2 to a previously derived bit sequence of W2;

repeating the deriving and the joining of the bit sequences of W1 and the bit sequences of W2 until a number of bits of each of the bit sequence W1 and the bit sequence W2 is equal to a number of bits of a bit sequence expressing encryption target data;

deriving a pseudo-random number bit sequence by computing an exclusive logical sum between the bit sequence W1 and the bit sequence W2; and encrypting the encryption target data by computing an exclusive logical sum between the pseudo-random number bit sequence and the bit sequence expressing the encryption target data.

9. A decryption method, comprising:

generating, via a computing device, two non-commutative matrices A1, A2 based on a d×d matrix A and two prime numbers p1, p2, wherein the d×d matrix A is private data that is set in common with a decryption device;

deriving, via the computing device, a vector $v_i^1$ by performing a plurality of matrix operations between the non-commutative matrix A1 and at least one of a d dimensional initial vector $v_0$ that is set in common with the decryption device or a previously derived d dimensional vector $v_{i-1}^1$, and deriving a vector $v_i^2$ by performing the plurality of matrix operations between the non-commutative matrix A2 and at least one of the initial vector $v_0$ or a previously derived d dimensional vector $v_{i-1}^2$, wherein the plurality of matrix operations comprises at least one of a sum calculation or a product calculation;

deriving, via the computing device, a bit sequence W1 by performing non-linear transformation to transform the vector $v_i^1$ into a current bit sequence of W1 and by joining the current bit sequence of W1 to a previously derived bit sequence of W1, and deriving a bit sequence W2 by performing non-linear transformation to transform the vector $v_i^2$ into a current bit sequence of W2 and by joining the current bit sequence of W2 to a previously derived bit sequence of W2;

repeating the deriving and the joining of the bit sequences of W1 and the bit sequences of W2 until a number of bits of each of the bit sequence W1 and the bit sequence W2 is equal to a number of bits of a bit sequence expressing decryption target data;

deriving a pseudo-random number bit sequence by computing an exclusive logical sum between the bit sequence W1 and the bit sequence W2; and decrypting the decryption target data by computing an exclusive logical sum between the pseudo-random number bit sequence and the bit sequence expressing the decryption target data.

10. The encryption device of claim 2, wherein:

deriving the bit sequence W1 further comprises performing a cutoff process on the current bit sequence of W1 to cut off a leading bit sequence satisfying a predetermined condition, and joining the current bit sequence of W1 from which the leading bit sequence has been cut off to the previously derived bit sequence of W1 from which the leading bit sequence has been cut off; and deriving the bit sequence W2 further comprises performing the cutoff process on the current bit sequence of W2 to cut off the leading bit sequence satisfying the predetermined condition, and joining the current bit sequence of W2 from which the leading bit sequence has been cut off to the previously derived bit sequence of W2 from which the leading bit sequence has been cut off.

11. The encryption device of claim 10, wherein:

the leading bit sequence consists of continuous 0s and a first 1 appearing after the continuous 0s, and the cutoff process further cuts off a predetermined number of bits after the leading bit sequence.

12. The encryption device of claim 1, wherein the sum calculation comprises a mod calculation.

13. The encryption device of claim 1, wherein the product calculation comprises a shift calculation, a division operation and an XOR calculation.

* * * * *